Sept. 12, 1967  M. SZABO  3,340,970
COLLAPSIBLE SELF-RETURNING HANDLE WITH HIDEAWAY LINKAGE
Filed April 18, 1966  2 Sheets-Sheet 1
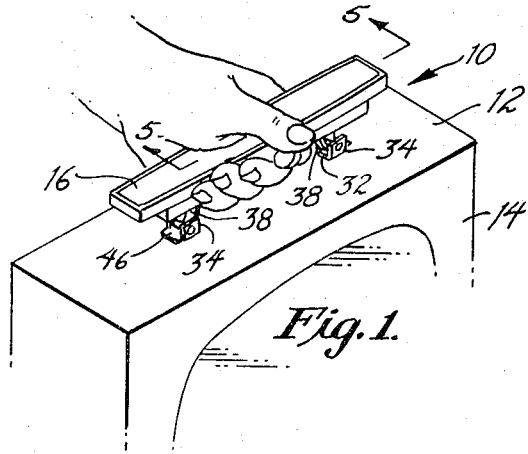
Fig.1.
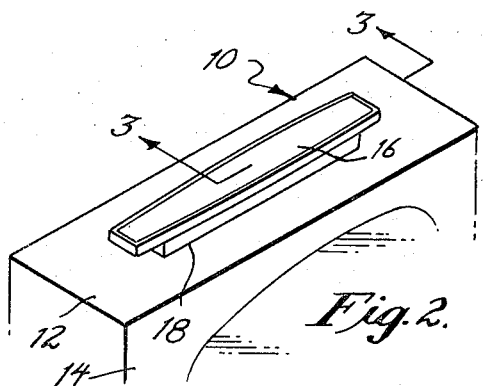
Fig.2.
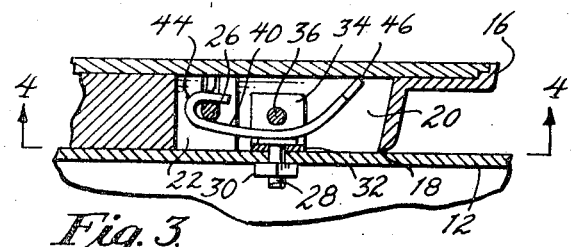
Fig.3.
Fig.7.
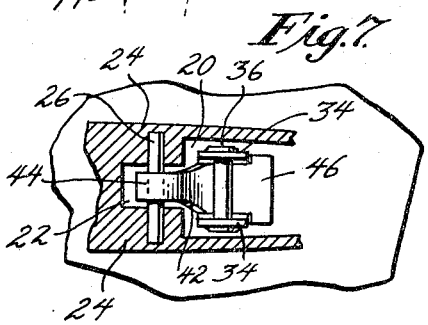
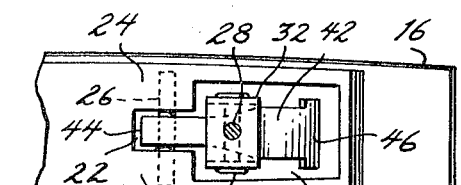
Fig.4.
Fig.5.
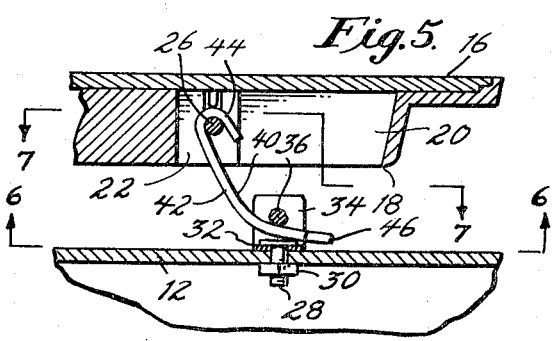
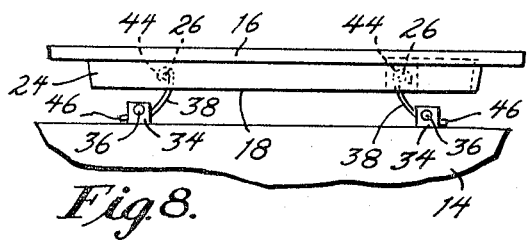
Fig.8.
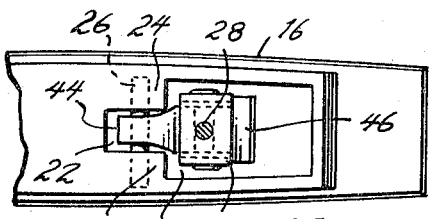
Fig.6.
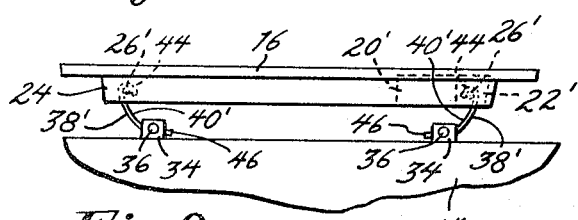
Fig.9.
INVENTOR.
MARTON SZABO
BY Melman and Jacobs
ATTORNEYS.

Sept. 12, 1967 M. SZABO 3,340,970
COLLAPSIBLE SELF-RETURNING HANDLE WITH HIDEAWAY LINKAGE
Filed April 18, 1966 2 Sheets-Sheet 2
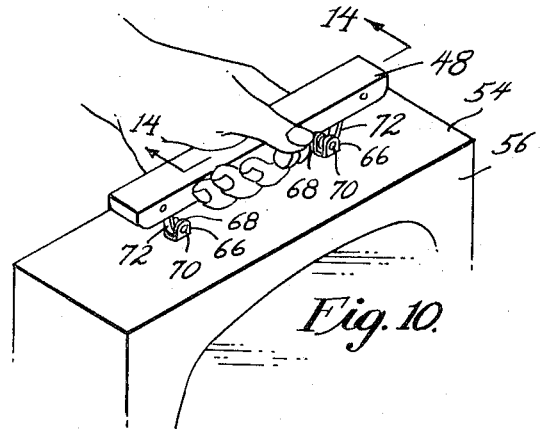
Fig. 10.
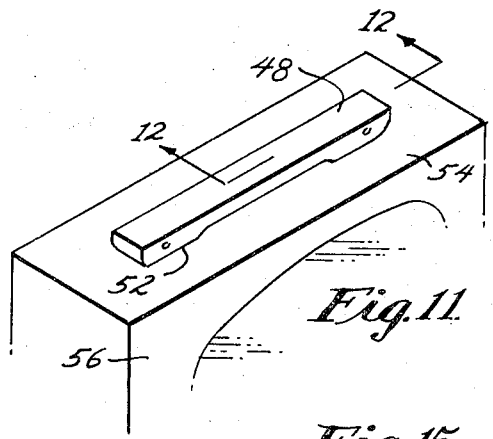
Fig. 11.
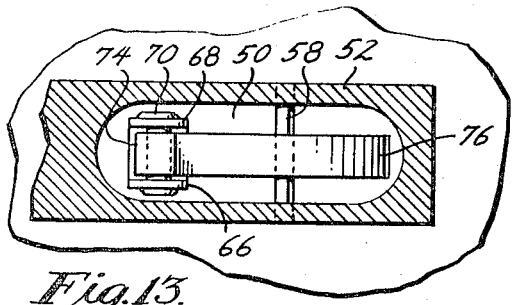
Fig. 13.
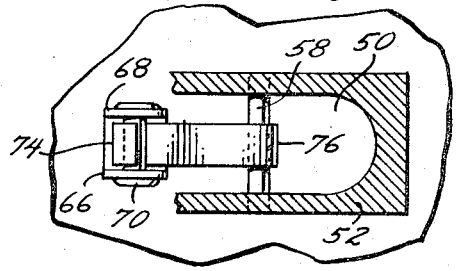
Fig. 15.
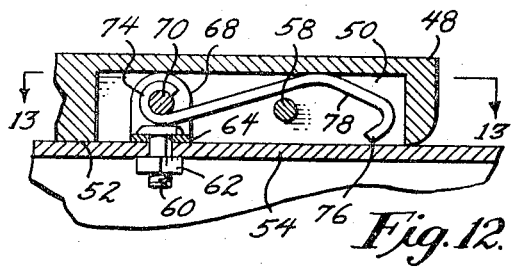
Fig. 12.
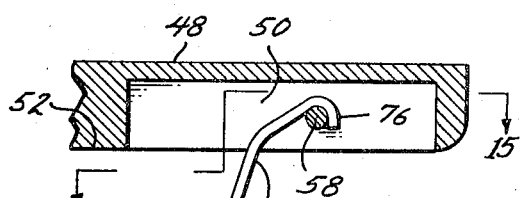
Fig. 14.
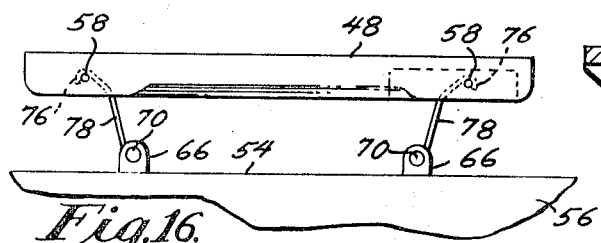
Fig. 16.
Fig. 17.
INVENTOR.
MARTON SZABO
BY Nielman and Jacobs
ATTORNEYS.

United States Patent Office 3,340,970
Patented Sept. 12, 1967

3,340,970
COLLAPSIBLE SELF-RETURNING HANDLE
WITH HIDEAWAY LINKAGE
Marton Szabo, Broomall, Pa., assignor to Philadelphia
Handle Company, Inc., Camden, N.J., a corporation
of New Jersey
Filed Apr. 18, 1966, Ser. No. 544,669
8 Claims. (Cl. 190—58)

ABSTRACT OF THE DISCLOSURE

A collapsible self-returning handle for a carrying case having a handgrip member with a pair of spaced recesses opening through the bottom thereof, a pair of links connecting the handgrip to the wall of a carrying case so that in the collapsed position with the bottom of the handgrip adjacent the wall of the carrying case, the recesses will confine the links and the means mounting the links both to the handgrip and the wall of the carrying case, the links being curved and mounted for both pivotal and sliding movement between the handgrip and the wall of the carrying case.

---

This invention constitutes an improvement over copending application Ser. No. 467,566 filed June 28, 1965, now Patent No. 3,296,120, and relates to a collapsible handle for use in transporting various carrying cases and particularly portable radios, television sets, electronic test equipment and the like wherein the handle can be lifted to a raised carrying position but falls of its own weight to a collapsed non-carrying position against the case, and in so doing conceals the linkage mounting the handle of the case.

The primary object of the invention is to provide a collapsible self-returning handle of the character described in which single instead of multiple links are used to mount the handgrip on the case thus simplifying the construction and assembly of the handle.

Another object of the invention is to provide a collapsible handle of the character described in which curved single links instead of multiple articulated links are employed to mount the handgrip on the case so that concealment of the links by the handgrip in its lowered non-support position on the case can be smoothly effected and without sacrificing the esthetic appeal of the handle.

A further object of the invention is to provide a collapsible handle of the character described which is functional and attractive yet relatively inexpensive to manufacture, assemble and repair.

These and other objects of the invention will become more apparent as the following description proceeds in conjunction with the accompanying drawing, wherein:

FIG. 1 is a fragmentary perspective view of one form of handle shown mounted on a case and in the raised position or carrying position;

FIG. 2 is a view similar to FIG. 1 showing the handle in its collapsed or non-carrying position;

FIG. 3 is a sectionl view taken on the line 3—3 of FIG. 2;

FIG. 4 is a bottom view looking from the line 4—4 of FIG. 3;

FIG. 5 is a sectional view taken on the line 5—5 of FIG. 1;

FIG. 6 is a bottom view looking from the line 6—6 of FIG. 5;

FIG. 7 is a sectional view taken on the line 7—7 of FIG. 5;

FIG. 8 is a side elevational view of the handle shown in the raised or carrying position;

FIG. 9 is a side elevational view of a second form of the handle shown in the raised or carrying position;

FIG. 10 is a view similar to FIG. 1 of a third form of the invention;

FIG. 11 is a view similar to FIG. 2 of said third form of the invention;

FIG. 12 is a sectional view taken on the line 12—12 of FIG. 11;

FIG. 13 is a sectional view taken on the line 13—13 of FIG. 12;

FIG. 14 is a sectional view taken on the line 14—14 of FIG. 10;

FIG. 15 is a sectional view taken on the line 15—15 of FIG. 14;

FIG. 16 is a side elevational view of said third form of handle shown in the raised or carrying position; and FIG. 17 is a view similar to FIG. 16 of a fourth form of the invention.

Specific reference is now made of the drawings wherein similar reference characters are used for corresponding elements throughout.

The instant handle is generally indicated at 10 and is shown attached to the upper wall 12 of a television set 14, it being understood that this is merely illustrative of other electronic devices, radios, test equipment and the like. Moreover, while the principles of the invention are particularly applicable to such equipment, they are also applicable to other carrying cases and luggage as well.

The handle includes an elongated rigid handgrip portion 16 which may be of any desired contour and may be made of plastic, wood, leather or the like materials, but is preferably molded as a one piece plastic member. The handgrip is made of a thickness which is comfortable to grip and includes an undersurface 18 which is adapted to lie flush against the upper surface of the attaching wall 12.

A pair of elongated recesses or cavities are provided in the handgrip which open through the undersurface 18, each recess being generally rectangular in horizontal cross-section and having a portion 20 adjacent the end of the handgrip and which is somewhat wider than a portion 22 which is closer to the center of the handgrip. Mounted in the side walls 24 of the hangrip and extending transversely in each narrower recess portion 22 is a pin 26.

At predetermined locations the wall 12 is provided with holes through each of which extends the shank of a threaded member 28 which receives a closure nut 30. It will be noted that the threaded member extends into the case beyond the wall 12 only for a distance sufficient to receive the closure nut. The shank is carried by a generally U-shaped member having a web 32 which bears on the wall 12 and a pair of spaced upstanding ears 34. A horizontal guide pin 36 is mounted on and extends transversely between the ears 34, the pin 36 being spaced above the wall 12 as shown. The horizontal cross-sectional contour of the bearing web 32 is preferably rectangular so that both bearing webs can be properly aligned relative to each other and to the recesses 20, 22 in the handgrip.

A pair of arcuate, preferably flat links 38 are provided to operatively connect the handgrip to each member 32, the arcuation being such that its concave surface 40 confronts the undersurface of the handgrip 16 and faces toward the ends of the handgrip 16, whereas its opposite convex surface 42 confronts the wall 12. The link passes slidably and guidingly between the pin 36, the web 32 and the ears 34 and includes a hook or sleeve portion 44 at one of its ends which rotatably engages the pin 26 and an enlarged portion 46 at its other end which extends laterally beyond the transverse spacing of the ears 34. The horizontal contour of each link is generally of the same shape as but shorter and narrower than that of the combined recesses 20 and 22, see FIGS. 4, 6 and 7.

In use, when the handgrip is moved from its collapsed position shown in FIGS. 2–4 to its raised position shown in FIGS. 1 and 5–8, each link 28 is pulled up because its hooked end 44 is attached to the pin 26 of the handgrip and rotates about the axis of the pin 26. In so doing, the pin 36 engages the concave surface 40 of the link to minimize vertical rattling while the ears 34 minimize lateral rattling of the links. The enlarged portion 46 at the other end of the link strikes the edges of the ears 34 thereby limiting the upward movement of the handgrip. When one lets go of or releases the handgrip, the weight of the handgrip causes it to collapse or move to a position wherein its bottom surface 18 bears on the top surface of the wall 12 of the case. In this action the links 36 move from a generally vertical to a generally longitudinal or horizontal position, see FIG. 3, and are confined in the recesses 20 and 22 as are the webs 32, ears 34 and pin 36.

The modification of FIG. 9 is the same in construction as that shown in FIGS. 1–8 and described hereinbefore except that the links 38' are arranged in such a fashion that their concave surfaces 40' face the center rather than the ends of the handgrip 16 which means that the pins 26' and narrower recesses 22' in which they extend are located adjacent the ends rather than towards the center of the handgrip while the wider recesses 20' are located towards the center rather than the ends of the handgrip to receive and conceal the links 38' when the handle is in its collapsed position against the carrying case.

In the modification shown in FIGS. 10–16, the handgrip 48 includes cavities or recesses 50 adjacent its ends which open through the undersurface 52, the latter being adapted to lie flat against the upper surface of the wall 54 of a suitable case 56. Mounted in the walls of each recess 50, extending transversely thereof and located towards the center of the handgrip are anti-rattle guide pins 58.

At predetermined locations the wall 54 is provided with holes through each of which extends the shank of a threaded member 60 which receives a closure nut 62, the member extending into the case only a distance sufficient to receive and retain the closure nut. The shank is carried by a generally U-shaped member having a web 64 which bears on the wall 12 and a pair of spaced upstanding ears 66 and 68, the horizontal cross-section of the web 64 being preferably rectangular so that they can be properly aligned relative to each other and to the recesses 50 of the handgrip. A horizontal pin 70 is mounted on and extends transversely between the ears 66 and 68.

A generally S-shaped link 72 is provided for operative connection between each pair of ears 66, 68 and the handgrip. One end of the link includes a hook or sleeve portion 74 which rotatably engages the pin 70 between each pair of ears 66, 68 whereas the other end of the link includes a hook 76 which is adapted to engage the guide pin 58 associated with the handgrip 48. It will be seen that the portion of the link from its approximate center to the hook 76 has a concave surface 78, see FIGS. 12 and 14, which confronts the upper surface of the wall 54 and faces outwardly towards the ends of the handgrip.

In use, when the handgrip is raised from the collapsed position shown in FIGS. 11–13 to the extended position shown in FIGS. 10 and 14–16, the hook or sleeve ends 74 of the links 72 pivot around the pins 70 and as the links begin to assume a generally more vertical position, the handgrip guide pins 58 ride against the concave surfaces 78 of the links until the hooks 76 engage the pins 58, thereby serving as stops to limit the upward movement of the handgrip. When the handgrip is released it drops of its own weight until its undersurface 52 engages the top of wall 54. In so doing, the pin 58 again serves to stabilize the movement of the links from their generally vertical positions shown in FIG. 14 to their generally longitudinal or horizontal positions shown in FIG. 12. It will be seen that the length and width of the links are such as to permit them to be readily confined and concealed in the recesses 50 when the handle is collapsed, the recesses also acting to receive and conceal the webs 64, the ears 66, 68 and the pins 70.

The modification of FIG. 17 is the same as that shown in FIGS. 10–16 and described hereinbefore except that the S-shaped links 72' include concave surfaces 78' from their approximate center to their hook ends 76' which do not only confront the wall 54 but face inwardly instead of outwardly of the handgrip. Otherwise, the movement of the links and their confinement in the recesses 50 is the same as described above.

While preferred embodiments of the invention have here been shown and described, a skilled artisan may make minor variations without departing from the spirit of the invention and the scope of the appended claims.

I claim:

1. In combination with a carrying case having a wall member, a collapsible self-returning handle comprising an elongated handgrip member having a lower surface including a flat portion, a pair of spaced longitudinal recesses in said handgrip member opening through said flat portion, a pair of links having end portions, means securing one end portion of each link to one of said members for pivotal movement about a transverse axis, and means slidably mounting the other end portion of each link on the other member, each link extending in a generally vertical position when said handgrip member is raised above said wall member to its carrying position and each link being so dimensioned and positioned as to be movable into said recess and assume a generally longitudinal position within the confines of said recess when said handgrip member is in its non-carrying position with said flat portion bearing on said wall member said recess also receiving and confining said means mounting said one and said other end portions of said link when said handgrip member is in said non-carrying position.

2. In combination with a carrying case having a wall member, a collapsible self-returning handle comprising an elongated handgrip member having a lower surface including a flat portion, a pair of spaced longitudinal recesses in said handgrip member opening through said flat portion, a pair of links having end portions, means securing one end portion of each link to one of said members for pivotal movement about a transverse axis, and means slidably mounting the other end portion of each link on the other member, each link extending in a generally vertical position when said handgrip member is raised about said wall member to its carrying position and each link being so dimensioned and positioned as to be movable into said recess and assume a generally longitudinal position within the confines of said recess when said handgrip member is in its non-carrying position with said flat portion bearing on said wall member, each link including an arcuate portion so that said link will assume said longitudinal position in said recess when the handgrip portion is in its non-carrying position, said means slidably mounting the other end portion of each link including a transversely extending pin adapted to abut said arcuate portion during movement of said link from its generally longitudinal to its generally vertical position.

3. The combination of claim 2 wherein said means slidably mounting the other end portion of each link further includes a pair of upstanding ears, said pin extending between said ears and said link extending between said ears and below said pin.

4. In combination with a carrying case having a wall member, a collapsible self-returning handle comprising an elongated handgrip member having a lower surface including a flat portion, a pair of spaced longitudinal recesses in said handgrip member opening through said flat portion, a pair of links having end portions, means securing one end portion of each link to one of said members for pivotal movement about a transverse axis, and means slidably mounting the other end portion of each link on the other member, each link extending in a generally vertical position when said handgrip member is raised above said wall member to its carrying position and each link being so dimensioned and positioned as to be movable into said recess and assume a generally longitudinal position within the confines of said recess when said handgrip member is in its non-carrying position with said flat portion bearing on said wall member, said one end portion of said link being pivotally secured to said wall member and said other end portion being slidably mounted on said handgrip member, said slidable mounting means including a transverse pin in said recess below said link.

5. In combination with a carrying case having a wall member, a collapsible self-returning handle comprising an elongated handgrip member having a lower surface including a flat portion, a pair of spaced longitudinal recesses in said handgrip member opening through said flat portion, a pair of links having end portions, means securing one end portion of each link to one of said members for pivotal movement about a transverse axis, and means slidably mounting the other end portion of each link on the other member, each link extending in a generally vertical position when said handgrip member is raised above said wall member to its carrying position and each link being so dimensioned and positioned as to be movable into said recess and assume a generally longitudinal position within the confines of said recess when said handgrip member is in its non-carrying position with said flat portion bearing on said wall member, said one end portion of said link being pivotally secured to said handgrip member and said other end portion of said link being slidably mounted on said wall member, said first-named means including a transverse pin in said recess and means at said one end portion of said link rotatably receiving said pin.

6. The combination of claim 3 and a lateral extension on said other end portion of said link adapted to engage said ears and limit movement of said link to a predetermined vertical position.

7. The combination of claim 4 wherein said link is generally S-shaped and includes a hook at said other end portion adapted to engage said transverse pin and limit movement of said link to a predetermined vertical position.

8. The combination of claim 5 wherein said slidable mounting means includes a pair of spaced upstanding ears mounted on said wall member and a transverse pin mounted between said ears, said link extending between said ears and beneath said transverse pin mounted between said ears.

References Cited

UNITED STATES PATENTS 2,273,417   11/1955   Furholmen _____ 16—115

FRANKLIN T. GARRETT, *Primary Examiner.*